United States Patent [19]

Tarbuck

[11] Patent Number: 4,600,228
[45] Date of Patent: Jul. 15, 1986

[54] LOCKABLE COMPLIANT END EFFECTOR APPARATUS

[75] Inventor: Robert R. Tarbuck, Ardmore, Pa.

[73] Assignee: Sperry Corporation, New York, N.Y.

[21] Appl. No.: 615,628

[22] Filed: May 31, 1984

[51] Int. Cl.$^4$ .............................................. B66C 1/02
[52] U.S. Cl. ................................... 294/64.1; 901/40;
414/744 B; 414/752
[58] Field of Search .................... 294/64.1, 65.5, 65;
414/752, 744 B, 737; 401/30, 37, 45, 40, 22

[56] References Cited

U.S. PATENT DOCUMENTS

| | | | |
|---|---|---|---|
| 3,230,002 | 1/1966 | Olson | 294/64.1 |
| 3,957,263 | 5/1976 | Christl | 294/64.1 X |
| 4,266,905 | 5/1981 | Birk et al. | 901/45 X |

FOREIGN PATENT DOCUMENTS 1068514  5/1967  United Kingdom ............... 294/64.1

*Primary Examiner*—Robert J. Spar
*Assistant Examiner*—Dennis Williamson
*Attorney, Agent, or Firm*—James R. Bell; Thomas J. Scott; Marshall M. Truex

[57] ABSTRACT

A lockable compliant end effector apparatus is useful with a robotic arm for the automated assembly of electronic equipment. The end effector includes a main body portion having first and second ends. A socket is formed in the first end. A first fluid passageway connects the socket with the second end of the main body portion. A member is mounted for multi-directional movement in the socket. The member is retainable in a stationary position relative to the socket and has a second fluid passageway formed therethrough. The second passageway has a first end adjacent the first passageway and a second end adjacent the first end of the main body. A sealing member is connected to the mounted member adjacent the second end of the second passageway. The end effector retains an electronic component in original orientation from a pickup point to an insertion point.

3 Claims, 3 Drawing Figures

LOCKABLE COMPLIANT END EFFECTOR APPARATUS

BACKGROUND OF THE INVENTION

1. Field of the Invention

This invention relates generally to work holders for electrical circuit assemblages and more particularly to the automated gripping of multiple lead electronic devices.

2. Background Description

Robots are used for the assembly of electronic equipment such as for mounting multiple lead IC chips and other electronic components on circuit boards. Examples of such devices include ceramic chip carriers, relays, transformers, IC components, resistor network components and other components having pins or fragile leads which may, for example, be on 0.050 inch centers. The components typically include from 24–54 such pins which are about 10.5 mils in diameter which are to be inserted into holes which are about 14–18 mils in diameter.

A holder device is attached to a robotic arm for picking up a pre-positioned component from a feeder and moving the component to a shear for the purpose of shearing the ends of the pins to a uniform length. The same arm, or in some cases another arm also having a holder device, then moves the component from the shear and mounts the component on the board by insertion of the sheared pins into associated holes in the board.

Various holder device include Bernoulli type, vacuum type and remote center compliant devices. These are limited in that they usually cause the component to move from its original orientation in the feeder to the orientation forced on the component by the interface of the holder and component.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a lockable compliant end effector apparatus including a main body portion having first and second ends and a socket formed in the first end. A first fluid passageway connects the socket and the second end of the main body portion. A means is mounted for multidirectional movement in the socket. The mounted means is retainable in a stationary position relative to the socket and has a second fluid passageway formed therethrough. The second passageway has a first end adjacent the first passageway and a second end adjacent the first end of the main body. A sealing member is connected to the mounted means adjacent the second end of the second passageway.

The foregoing and other aspects will become apparent from the following detailed description of the invention when considered in conjunction with the accompanying drawing. It is to be expressly understood, however, that the drawing is not intended as a definition of the invention but is for the purpose of illustration only.

DESCRIPTION OF THE PREFERRED EMBODIMENT

Figure 1:
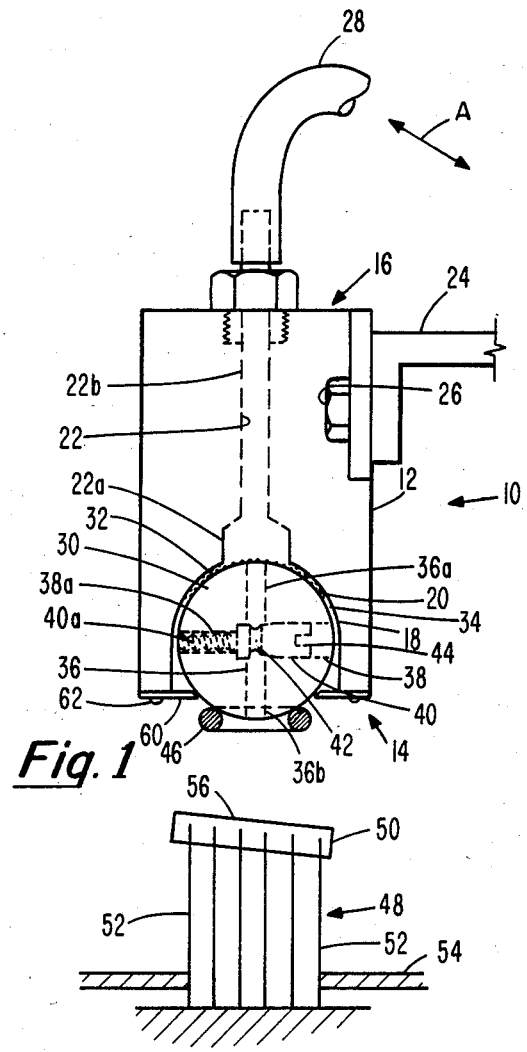
FIG. 1 is a side view illustrating an embodiment of the lockable compliant end effector apparatus of this invention.

A lockable, compliant end effector apparatus is generally designated 10 in FIG. 1 and includes a main body portion 12 formed of a suitable material. Main body 12 has a first end 14 and a second end 16. A spherical socket 18 is formed in first end 14 and includes a roughened or abrasive type spherical surface 20 of the type which is a relatively high friction surface. A fluid passageway 22 is formed through body 12 and has a first passage end 22a adjacent socket 18 and a second passage end 22b adjacent second end 16. Body 12 is of a construction sufficient for connection to a known robotic arm 24 by suitable means such as bolts 26. Arm 24 is of the type used for automated assembly of electronic equipment. Also, body 12 is provided to have a fluid conduit 28 connected to passageway 22 at second end 16. Conduit 28 is connected to a known system (not shown) capable of forcing a fluid such as air, either into or out of body 12 as illustrated by a bidirectional arrow designated A. Thus, a positive or negative (vacuum) air flow may be induced on apparatus 10. A spherical member 30 is formed of a suitable material and is mounted for rotation in any direction within socket 20. Member 30 includes a spherical surface 32 of a size sufficient to permit member 30 to rotate within socket 18 and provide sufficient room for an air bearing 34 to be formed between surfaces 20 and 32. Also, surface 32 is roughened in a manner similar to roughened surface 20 of member 12. A fluid passageway 36 is formed through member 30. Passageway 36 has a first passage end 36a adjacent passageway 22 and a second passage end 36b adjacent end 14 of body 12. A bore 38 is formed in member 30 and extends transversely to passageway 36. Bore 38 includes a threaded extension 38a. A suitable flow adjustment member 40 is rotatably mounted in bore 38 and includes a threaded portion 40a engaged with extension 38a. Also, member 40 includes an orifice 42 formed therethrough which can be alignably adjusted relative to passageway 36, and a socket 44 formed in an end thereof. A resilient sealing member such as a flexible "O" ring 46 is suitably attached adjacent end 36b of member 30. A suitable non-sealing retainer ring member 60 is removably connected to end 14 of member 12 by fasteners 62 as a means of retaining member 30 in socket 18 so as not to interfere with movement of member 30.

An exemplary electronic component designated 48, includes a body portion 50 and a plurality of pins or leads 52 extending therefrom. Component 48 is mounted in a feeder 54 in a fixed original orientation position which may be due to varying lengths of pins 52 and/or the angular relationship between body 50 and pins 52. It can be seen therefore that a surface 56 of body 50 may be angularly disposed relative to ring 46 of apparatus 10.

Figure 2:
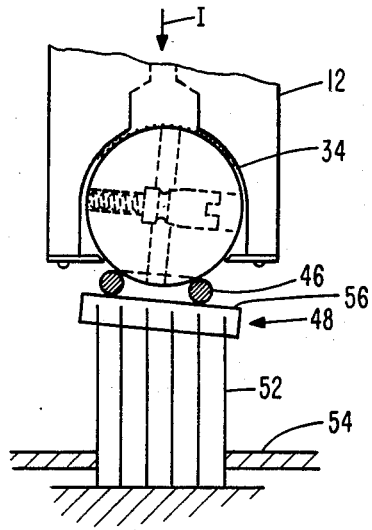
FIG. 2 is a partial side view illustrating a sphere rotated in a socket for alignment with a component.
Figure 3:
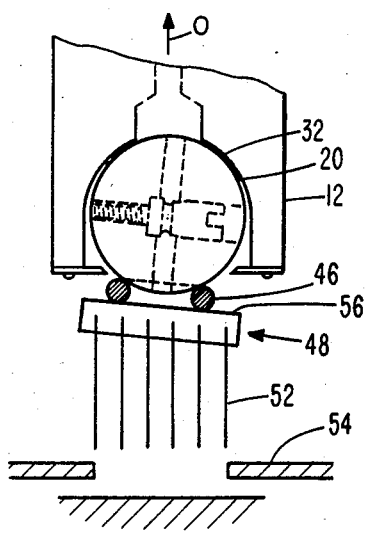
FIG. 3 is a partial sideview illustrating pick-up of a component maintaining initial orientation with a feeder.

In operation, with the parts assembled as illustrated, a light air pressure is applied into body 12 via conduit 28 as illustrated by the directional arrow designated I in FIG. 2. The air flows through passageway 22, into socket 18 between surfaces 20 and 32, through passageway 36 and orifice 42 which has been rotated to a selected orientation relative to passageway 36 for controlling restriction of air flow through passageway 36. Robotic arm 24 moves apparatus 10 toward component 48. The air forces member 30 against retainer 60. As an edge of sealing ring 46 touches surface 56, member 30 is caused to rotate on the air bearing 34. As a result, the available area for permitting air to escape between ring 46 and surface 56 gradually decreases. This causes pressure to build up within the confines of ring 46. The air pressure within ring 46 begins to balance with the air pressure in air bearing 34 thus causing ring 46 and surface 56 to easily align due to the fact that member 30 is floating as illustrated in FIG. 2. When alignment between ring 46 and surface 56 is achieved, a suitable sensor (not shown) can determine the air pressure buildup described above and stop downward arm motion. Associated circuitry can reverse the air pressure from positive to negative (vacuum) illustrated by the directional arrow designated 0, FIG. 3, thus causing member 30 to move upwardly in socket 18 so that roughened surfaces 20, 32 can engage in a locked position. Simultaneously, surface 56 is engaged by sealing ring 46. Thus, when arm 24 is withdrawn, component 48 is moved out of feeder 54 (see FIG. 3), so that the original orientation of component 48 in feeder 54 is maintained. Original orientation is maintained by apparatus 10 regardless of the manner in which component 48 is seated in feeder 54. Moreover, this original orientation is directly related to the calibrated, dimensional referencing of the robots coordinate system so that the pin positions are now precisely related to this coordinate system.

The foregoing has described an end effector apparatus which can compliantly align with the surface of a component to be picked up. When alignment is achieved, the end effector can lock and retain the pickup position which permits the component to retain the original orientation relative to the feeder which holds the component prior to pickup. This is accomplished by a spherical member having a rough spherical surface and being capable of floating on an air bearing within a socket having an associated rough spherical surface.

As a result, the component is not moved from the original orientation to an orientation forced by the end effector. Instead, the end effector is forced to align with the pickup surface of the component.

It is anticipated that the aspects of the present invention, other than those specifically defined in the appended claims, can be obtained from the foregoing description and the drawings.

Having thus described the invention, what is claimed is:

1. A lockable compliant end effector apparatus for picking up an associated object comprising:
   a main body portion having first and second ends, said body defining a socket having a first rough spherical surface formed in said first end and a first fluid passageway connecting said socket and said second end of said main body;
   means mounted for multi-directional movement to a desired position in said socket, and for being locked in said desired position, said mounted means having a second rough spherical surface adjacent said first rough spherical surface, said spherical surfaces defining an air bearing therebetween, said mounted means having a second fluid passageway formed therethrough, said second passageway having a first end adjacent said first passageway and a second end adjacent said first end of said main body;
   means for maintaining said mounted means in said socket and for limiting air flow between said rough surfaces;
   a sealing member connected to said mounted means adjacent said second end of said second passageway; and
   conduit means connected to said main body portion for conducting air in either of a first and second direction through said passageways and through said air bearing, whereby said mounted means is movable to said desired position in response to said air being conducted in said first direction when said sealing member is in proximity with said object, and said mounted means is locked in said desired position in response to said air being conducted in said second direction when said sealing member engages said object and said first rough surface engages said second rough surface.

2. The apparatus of claim 1 including:
   means for adjusting fluid flow through said second passageway.

3. The apparatus of claim 1 wherein said main body portion is adapted for connection to an associated robotic arm.

* * * * *